United States Patent [19]
Du-Rocher et al.

[11] Patent Number: 5,651,687
[45] Date of Patent: Jul. 29, 1997

[54] ELECTRICAL CONNECTOR ASSEMBLY

[75] Inventors: Daniel J. Du-Rocher, Leonard, Mich.; Steven John Tregurtha, Oswaldtwistle, England

[73] Assignee: Lucas Industries Public Limited Company, United Kingdom

[21] Appl. No.: 533,950

[22] Filed: Sep. 26, 1995

[30] Foreign Application Priority Data

Sep. 27, 1994 [GB] United Kingdom ............... 9419415
Apr. 5, 1995 [GB] United Kingdom ............... 9507011

[51] Int. Cl.⁶ ................................................ H01R 35/04
[52] U.S. Cl. ........................................ 439/164; 439/15
[58] Field of Search ................................. 439/164, 15

[56] References Cited

U.S. PATENT DOCUMENTS

| | | |
|---|---|---|
| 4,607,898 | 8/1986 | Reighard et al. |
| 4,735,573 | 4/1988 | Zeller et al. ............... 439/15 |
| 4,867,688 | 9/1989 | Suzuki ........................ 439/15 |
| 4,875,860 | 10/1989 | Suzuki ........................ 439/15 |
| 5,171,157 | 12/1992 | Bolen ......................... 439/164 |
| 5,226,830 | 7/1993 | Ueno .......................... 439/164 |
| 5,226,831 | 7/1993 | Horiuchi ...................... 439/164 |
| 5,314,344 | 5/1994 | Ida et al. ..................... 439/164 |
| 5,334,023 | 8/1994 | Schauer et al. ............... 439/164 |

FOREIGN PATENT DOCUMENTS

| | | |
|---|---|---|
| 8322373 | 12/1983 | Germany . |
| 4014485 | 11/1991 | Germany . |
| 2250146 | 11/1991 | United Kingdom . |

*Primary Examiner*—Gary F. Paumen
*Attorney, Agent, or Firm*—Andrus, Sceales, Starke & Sawall

[57] ABSTRACT

An electrical connector assembly is disclosed which comprises first and second elements rotatable with one another and housing a conductor electrically connecting respective terminals provided on the first and second elements. A locking assembly is provided to restrict removal of the connector assembly from a support structure, the locking assembly including a locking member moveable in response to movement of the second element relative to the first element to and from a datum position such that the locking assembly permits removal or replacement of the connector assembly when the second element is in the datum position and prevent such removal or replacement when the second element does not occupy the datum position.

9 Claims, 6 Drawing Sheets

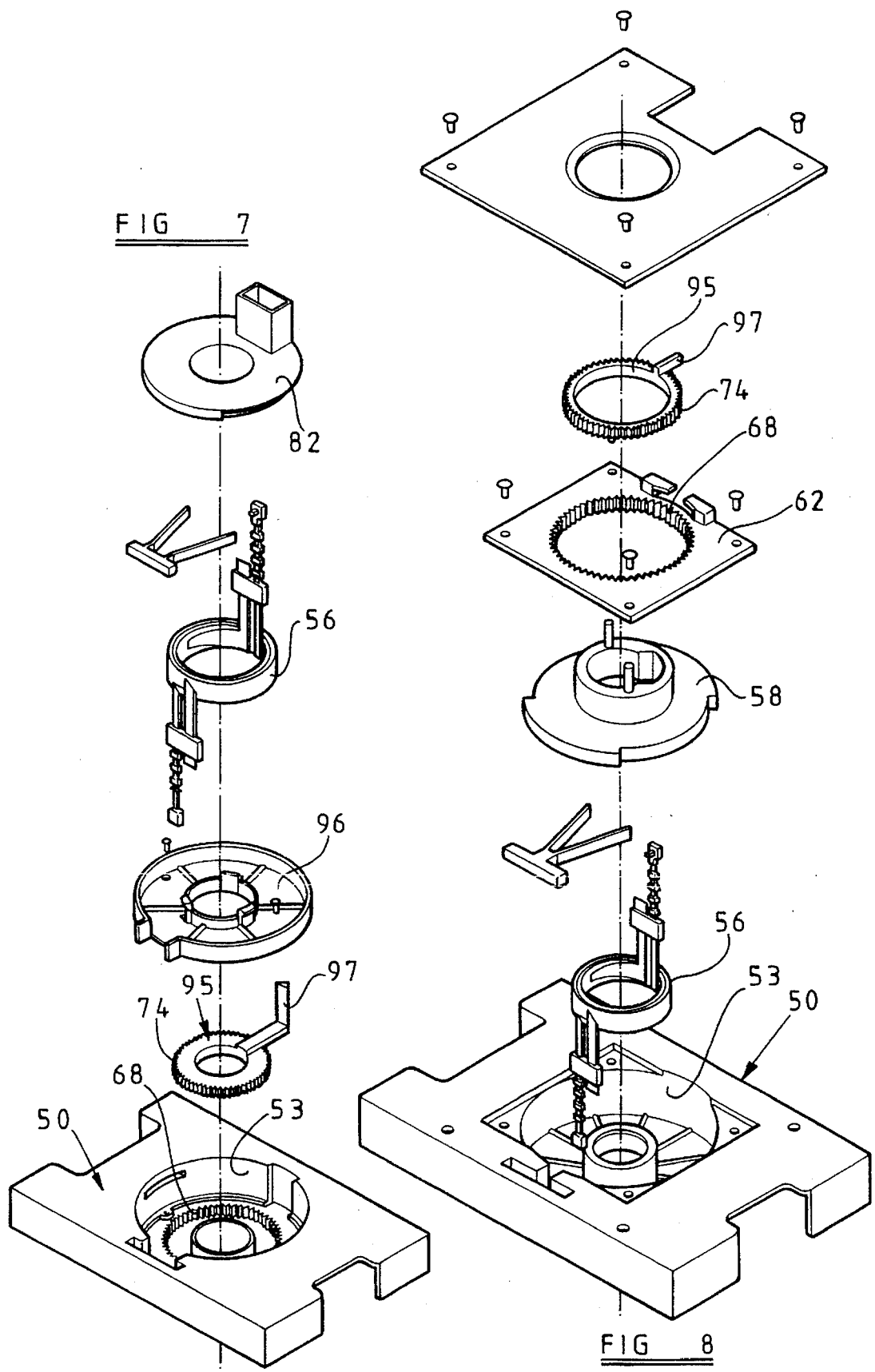

ELECTRICAL CONNECTOR ASSEMBLY

BACKGROUND OF THE INVENTION

This invention relates to a rotary electrical connector assembly for use primarily but not exclusively in making an electrical connection between a vehicle electrical system and a component carried by and rotatable with the steering shaft of the vehicle.

It is known to utilize a slip ring assembly to make a rotating electrical connection to a component, for example a steering wheel mounted horn switch of a vehicle, but it is found that such electrical connections may not exhibit the necessary reliability for making connection to a safety critical component such as the inflation system of a steering wheel mounted air-bag assembly.

It has previously been proposed to minimise this difficulty by utilizing a high reliability connector such as a so called "clock-spring" or spiral cassette type connector in safety critical applications. This type of connector includes a spirally wound flat strip including at least one conductor, the strip being wound so as to form a coil encircling the axis of rotation of the steering shaft, electrically to interconnect at least one terminal member on a fixed housing part and at least one terminal member on a housing part rotating with the steering shaft. The spiral conductor coil is designed to accommodate the range of rotation of the steering shaft, usually no more than two or three revolutions in either direction from a central position, the coil being wound tighter or unwound dependent upon the direction of rotation. There is of course no sliding electrical connection and the integrity of the electrical connection between the terminals is certain to be maintained through the intended rotational range.

It will be recognised that the connector is designed to be operated such that at the central point in the range of movement of the steering shaft, the coil is at the mid-point of its winding movement. Such an orientation of the "clock-spring" relative to the steering shaft is relatively easy to ensure during original assembly of the vehicle but may be lost during subsequent removal and reassembly of the steering assembly of the vehicle which may become necessary in use. Clearly should a "clock-spring" connector be removed when at a position corresponding to the steering being at one extreme and then reassembled with the steering at its opposite extreme, then there is a serious risk of failure of the connector through over tightening or over-unwinding of the coil in use and it is an object of the present invention to minimise this risk.

SUMMARY OF THE INVENTION

According to the present invention there is provided an electrical connector assembly comprising a first element arranged to be fixed, in use, and being arranged to carry at least one first electrical terminal, a second element rotatable relative to the first element, in use, and being arranged to carry at least one second terminal, an elongate flexible conductor electrically connected between the at least one first and second terminals and extending around the axis of rotation of the second element relative to the first element, and a locking assembly including a locking member movable in response to movement of the second element to and from a datum position relative to the first element such that when the second element is in its datum position, the locking assembly permits removal or replacement of the connector assembly relative to a support structure, the locking assembly preventing such removal or replacement when the second element does not occupy the datum position.

The locking member is conveniently a member movable in response to movement of the second element between a first position in which it does not obscure access to a retainer when the second element is in the datum position, and a second position in which access to the retainer is obscured when the second element does not occupy the datum position.

It will be recognised that when access to the retainer, for example a retaining screw, is obscured, removal or replacement of the connector assembly is not possible, such removal or replacement requiring access to the retainer.

Alternatively, the locking member may be arranged to be moveable between an inoperative position and an operative position in response to movement of the second element to and from the datum position relative to the first element, said locking member in use cooperating with abutment means fixed in relation to the support structure such that when said second element is in said datum position said locking member will be in an inoperative position permitting removal or replacement of the connector assembly relative to said support structure, while when said second element does not occupy said datum position said locking member will engage said abutment means to prevent removal or replacement of the connector assembly relative to said support structure.

The limited range of movement may be approximately two to three rotations of the second element with respect to the first element in either direction from a central position.

Preferably said datum position of said second element is a central position in its range of rotation relative to said first element.

The locking member preferably comprises a slidable bolt arranged to move in one direction to engage a first abutment on rotation of the second element with respect to the first element away from said datum position in one direction, and to move in the opposite direction to engage a second abutment on rotation away from said datum position in the other direction. The first and second abutments preferably comprise walls defining recesses into which the ends of the bolt are slidable.

Preferably, the locking assembly further comprises reduction means whereby a relatively large rotational movement of the second element relative to the first element results in a relatively small movement of the locking member.

The reduction means conveniently comprises an harmonic gear reduction mechanism comprising a first member having teeth provided on an inner cylindrical surface thereof, a second member of diameter less than the diameter of said inner cylindrical surface, said second member being provided with a different number of teeth to the first member, and an eccentric cam arranged to be rotated with said second element, said cam cooperating with said second member to cause teeth of the second member to mate with teeth of the first member progressively around said second member as the cam rotates.

It will be recognised that on rotation of the eccentric cam, the teeth on different parts of the second member will engage and disengage with the teeth of the first member, and that after one complete rotation of the eccentric cam, the second member will have rotated with respect to the first member by an angle corresponding to the difference in the number of teeth on the first and second members.

The second member is preferably provided with an upstanding peg arranged to extend through an elongate aperture provided in a flange provided on the bolt whereby angular movement of said second member arising from rotation of said cam results in movement of the peg, and hence in sliding movement of the bolt.

In accordance with a second aspect of the invention there is provided an electrical connector assembly comprising a first element arranged to be fixed, in use, a second element rotatable relative to the first element, an elongate flexible conductor extending between said elements so as to be wound or unwound by relative rotation of the elements between limits, and a slip ring assembly including at least one slip ring carried by said second element and an electrical contact in wiping engagement with the slip ring and carried by said first element.

BRIEF DESCRIPTION OF THE DRAWINGS

The invention will further be described, by way of example, with reference to the accompanying drawings, in which:

FIGS. 7 and 8 are, respectively, views similar to FIG. 3 of two further modifications.

DETAILED DESCRIPTION OF THE INVENTION

Figure 1:
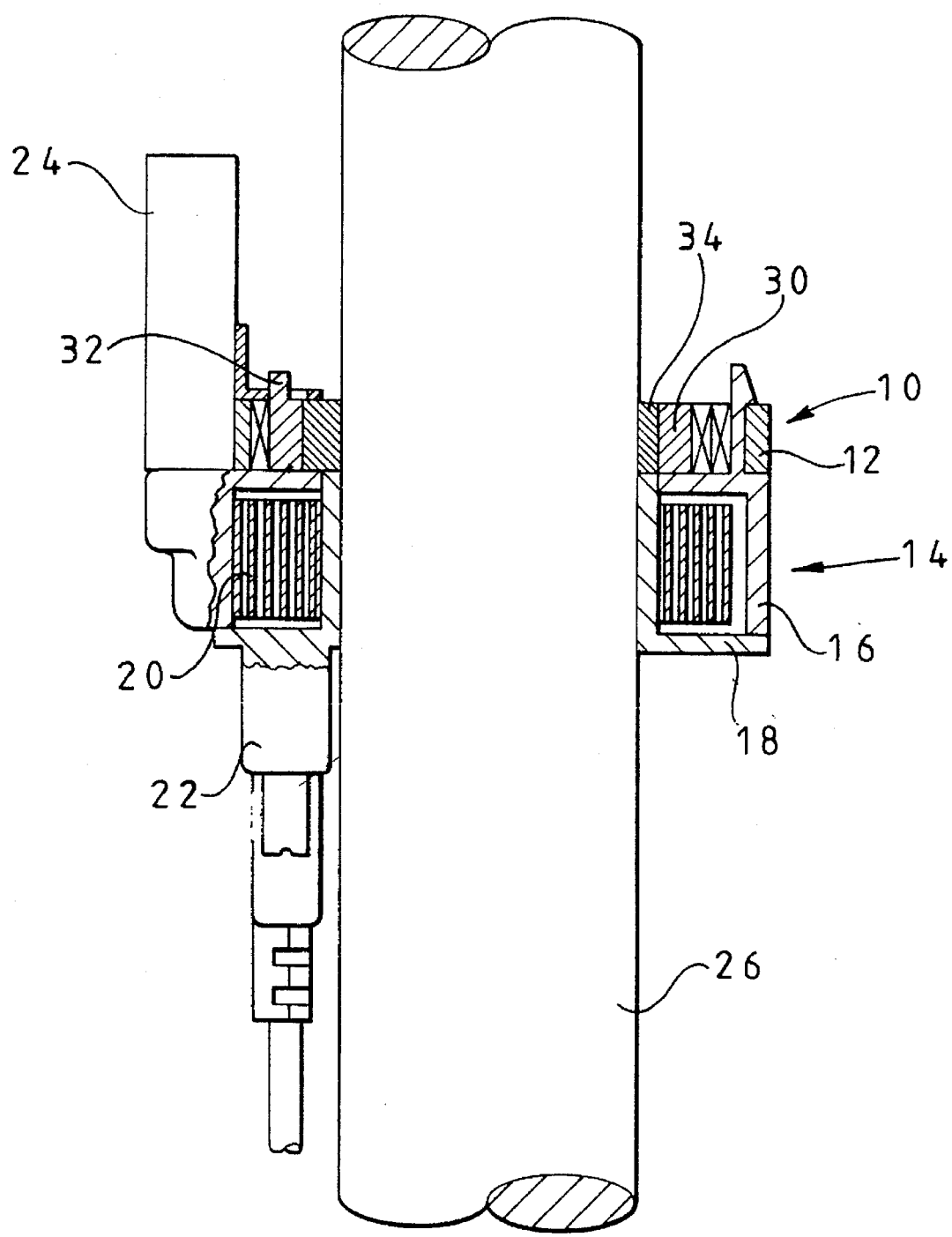
FIG. 1 is a cross-sectional view of an electrical connector assembly including a locking assembly, in accordance with an embodiment of the invention.
Figure 2:
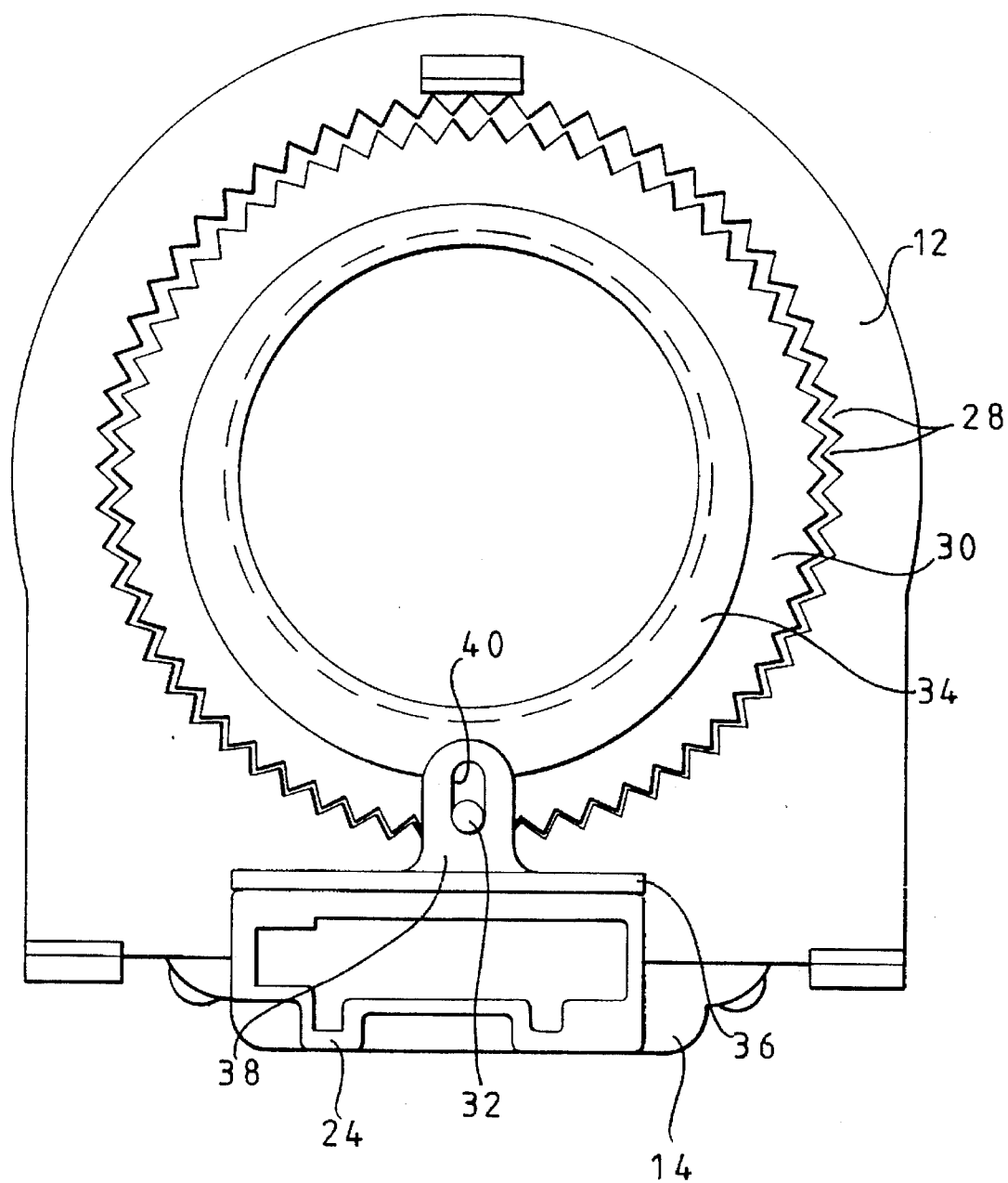
FIG. 2 is a plan view of the locking assembly of the connector of FIG. 1.

Referring to FIGS. 1 and 2, the electrical connector assembly is intended for making an electrical connection between a vehicle electrical system and an inflation mechanism of an air bag carried on the vehicle steering wheel and includes a locking assembly 10 having a plastics moulding 12 arranged to be snap-fitted to an electrical connector housing. The housing 14 comprises a first moulded plastics element 16 of generally annular form arranged to be secured to a stationary part of a vehicle steering column, and a second annular, moulded plastics element 18 which is rotatably mounted upon the first component 16, and keyed to the vehicle steering shaft 26 to rotate therewith. Each of the first and second elements 16, 18 includes a socket terminal or other electrical connector 22, 24. A loosely wound spiral coil 20 of an electrically conducting cable or ribbon is positioned between the first and second elements 16, 18, the outer end of the coil 20 being connected to the socket 24 of the first element 16, the inner end of the coil 20 being connected to the socket 22 of the second element 18 and the coil 20 encircling the steering shaft 26. During rotation of the steering wheel, the second element 18 rotates with the steering shaft 26 to either tighten or loosen the coil 20 around the shaft, the electrical supply between the socket 24 of the first element 16 and the socket 22 of the second element 18 being unbroken at all times.

The moulding 12 of the assembly 10 comprises a hollow cylindrical portion of relatively short axial length, the inner peripheral surface thereof being provided with a plurality of gear teeth 28. An annular gear 30 of smaller outer diameter than the inner diameter of the plastics moulding 12 is positioned within the circle of teeth 28, the gear 30 having one less tooth than the plastics moulding 12. An upstanding peg 32 is provided on one of the surfaces of the gear 30. An eccentric cam 34 is rotatable within the aperture of the gear 30, the eccentric cam 34 having an aperture through which the steering shaft 26 extends in use, the cam 34 being keyed to the second element 18 and/or the shaft 26, so as to rotate therewith.

It will be recognised that the eccentric cam 34 displaces the gear 30 laterally such that the teeth on one part of the gear 30 mate with the teeth 28 of a respective part of the plastics moulding 12, diametrically opposite teeth of the moulding 12 and gear 30 being out of engagement. On rotation of the eccentric cam 34, the direction of displacement of the gear 30 progresses around the moulding 12 such that the teeth of a different part of the gear 30 mate with the teeth 28 on respective parts of the plastics moulding 12. For each complete rotation of the eccentric cam 34, the gear 30 rotates with respect to the plastics moulding 12 by an amount corresponding to the angle subtended by one tooth 28 of the plastics moulding 12 (there being one less tooth on gear 30 than the number of teeth 28 of moulding 12).

The locking assembly 10 further comprises an elongate, slidable bolt 36 which includes a flange 38 provided with an elongate slot 40 through which the upstanding peg 32 of gear 30 extends, the elongate slot 40 permitting movement of the peg 32 in a direction towards and away from the bolt 36. Rotation of the cam 34 causes the gear 30 to rotate by a small amount. Since the peg 32 is carried by the gear 30, such movement results in a small longitudinal sliding movement of the bolt 36.

The supporting structure to which the connector 14 is mounted is provided with a pair of spaced recesses of dimensions permitting the ends of the bolt to slide therein. The recesses are spaced apart and face one another such that in a central position of the bolt 36, the end portions thereof do not extend into either of the recesses. Sliding movement of the bolt 36 in one direction results in one end of the bolt entering one of the recesses, whilst sliding movement of the bolt 36 away from the central position in the other direction results in the other end thereof entering the other recess. It will be recognised that while the bolt 36 is in the central position, the connector assembly including the locking bolt can be removed by being slid along the steering shaft 26 after removal of mounting bolts. However when the bolt 36 extends into one or other of the recesses, such removal is not possible.

In use, in order to remove the connector assembly 14 from the vehicle, the steering wheel and shaft 26 are rotated until the steered wheels are in their straight ahead position. Such rotation results in sliding movement of the bolt 36 towards its central position so that when the straight ahead position is reached, the second element 18 is in a central position (or other predetermined datum position) and the bolt 36 is in its central position, with both ends clear of the abutment recesses such that the assembly may be removed from the vehicle.

When replacing the connector assembly, if rotation of the second element 18 with respect to the first element 16 has occurred, the cam 34 will also have rotated resulting in movement of the gear 30 and hence sliding movement of the bolt 36 from its central position. Such sliding movement of the bolt 36 prevents the assembly from being replaced on the steering column by virtue of one end of the bolt 36 engaging the mounting. In order to complete replacement, the second element 18 must be returned to its original datum position (the central position) so that the bolt 36 occupies its central position.

It will be recognised that other gear reduction mechanisms could be used rather than the harmonic gear reduction mechanism of the above described embodiment, but it is desirable for the gear reduction mechanism to be positive and to be such that a relatively small amount of movement of the sliding bolt 36 occurs as a result of a large rotation of the steering shaft 26.

As an alternative to using a sliding bolt 36, one surface of the gear 30 could be provided with an outwardly extending flange, the mounting including an inwardly extending flange which, other than at one predetermined position of the gear 30, is arranged to engage with the outwardly extending flange of the gear 30 to prevent removal of the connector assembly.

In the above description, the locking assembly 10 is intended to be snap-fitted onto the moulding 16. It will be recognised that other methods of incorporating the locking assembly 10 in the electrical connector assembly may be used, or the lock assembly moulding 12 may be integral with the connector moulding 16.

Figure 3:
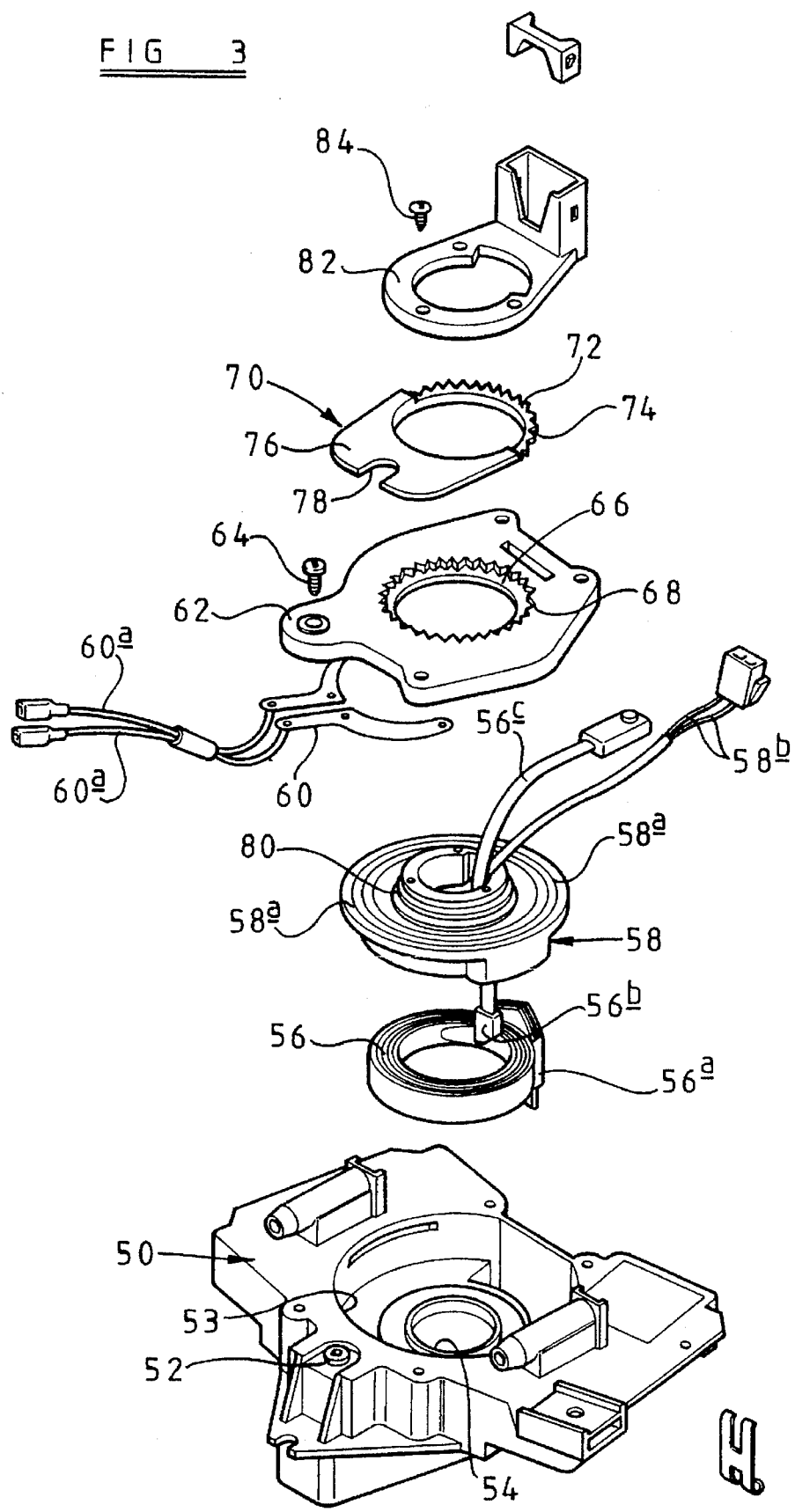
FIG. 3 is a diagrammatic exploded perspective view of support structure including an electrical connector assembly in accordance with a second embodiment of the invention.
Figure 4:
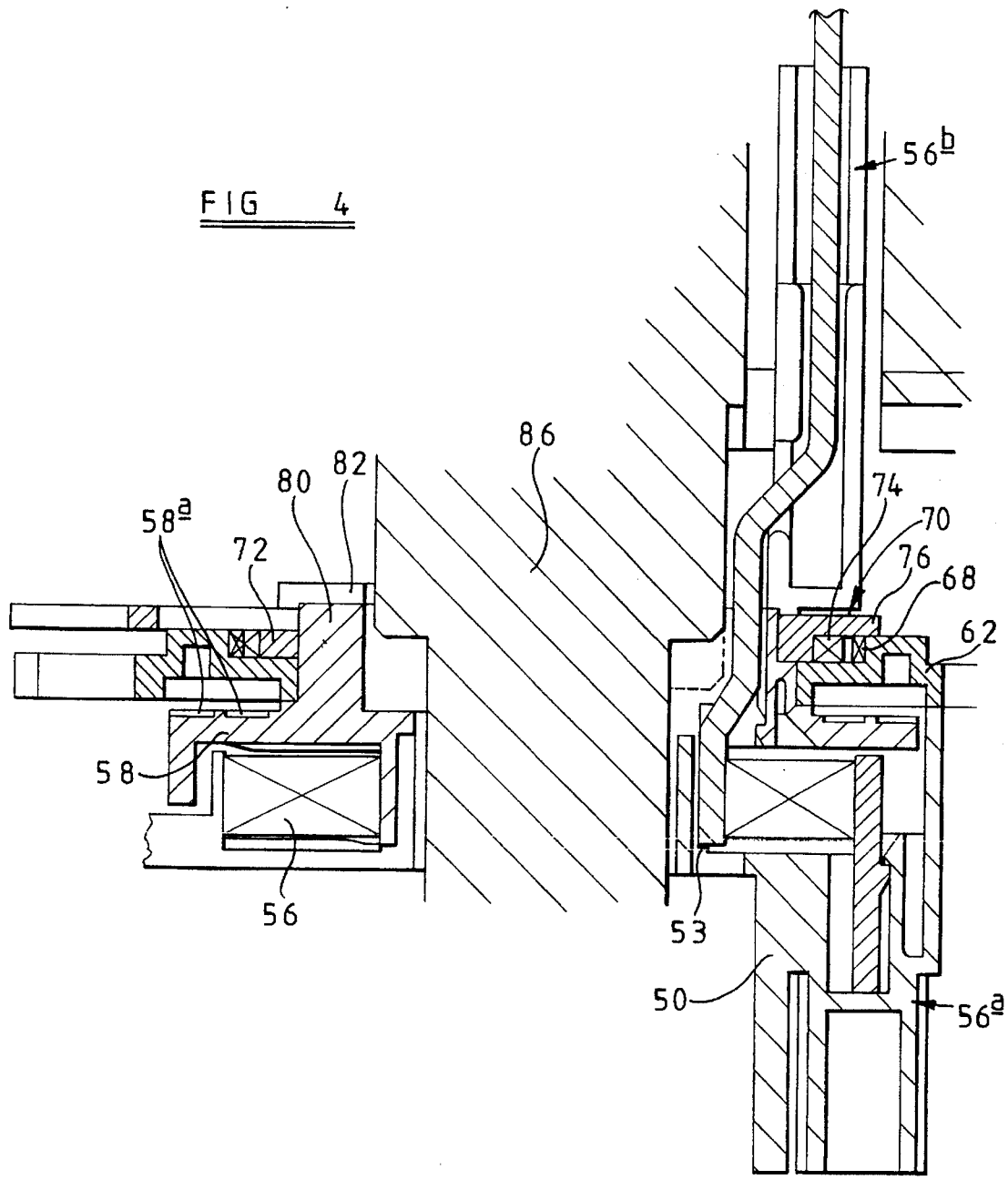
FIG. 4 is a cross-sectional view of the assembled support structure and connector assembly of FIG. 3.

The support structure illustrated in FIGS. 3 and 4 of the drawings is intended to be attached to the fixed part of the steering column assembly of a vehicle with the rotatable steering shaft of the steering column extending therethrough. The assembly supports, in use, switch gear including a direction indicator switch and further supports a clock-spring or spiral cassette-type electrical connector for use in connecting a steering wheel mounted air bag or other safety critical device to the electrical circuits of the vehicle. In addition the support structure carries a slip ring assembly intended to permit connection of one or more steering wheel mounted switches to the vehicle's electrical system to permit control of the operation of, for example, the vehicle's horn from a steering wheel mounted switch.

It is possible to provide the slip ring assembly separate from the clock-spring type connector, the two being spaced apart from one another on the support structure. However in order to minimize the dimensions of the two devices and of the overall assembly, it is desirable to combine the two devices, providing them within a single housing of dimensions preferably not significantly greater than those of the housing of the clock-spring type connector alone.

The support structure, which is arranged to be connected to the steering column of a vehicle, defines a housing 50 and includes a screw operated clamp mechanism 52 for clamping the housing 50 in position on the fixed, outer sleeve of the steering column. A generally cylindrical recess 53 is formed in the housing 50, the base of the recess being provided with an aperture 54 through which the steering shaft 86 of the vehicle extends, in use.

A "clock-spring" or spiral cassette type connector 56 is received within the recess 53. The connector 56 comprises a loosely wound length of an electrically conductive material, the windings of the connector 56 encircling the steering shaft of the vehicle. The ends of the connector 56 are connected to first and second terminals 56a, 56b to permit the connector 56 to be connected to both the electrical system of the vehicle and to the air bag to permit actuation of the air bag. The first terminal 56a extends through an aperture it, the housing 50, thus anchoring one end of the connector 56 to the housing 50.

The recess 53 further houses a slip ring arrangement comprising a moulded plastics member 58 upon which two annular, concentric electrically conducting tracks 58a are provided. The member 58 overlies the connector 56 and is rotatable within the recess 53, the second terminal 56b of the spiral connector 56 which is intended to be connected to the steering wheel mounted air bag being engaged with the member 58 for movement therewith. In the example shown in FIG. 3 the terminal 56b is actually a moulded component within which a permanent electrical connection is made between the connector 56 and a lead 56c for connection to the air bag. It is to be recognised that in some applications the lead 56c could be detachable at the terminal 56b.

The slip ring arrangement further comprises a pair of arcuate leaf spring contacts 60 which are arranged to engage the tracks 58a respectively so as to be electrically connected thereto. The contacts 60 are arranged to be connected to the electrical system of the vehicle through leads 60a, the tracks 58a being connected through leads 58b to steering wheel mounted switches for use in controlling the operation of, for example, the vehicle's horn.

An annular cover 62 overlies the end of the recess 53 remote from its base, the central aperture 66 of the cover being aligned with the aperture 54 provided in the base, the steering shaft 86 extending through the aperture 66, in use. As shown in FIG. 3, the cover 62 may be secured in position using screws 64. However, other techniques could be used to secure the cover 62 in position, for example, by means of welding, or alternatively using a snap-fit arrangement.

The outer surface of the cover 62 is provided with a shallow circular recess which is coaxial with but of larger diameter than the aperture 66. The outer wall of the recess is provided with a plurality of inwardly extending gear teeth 68.

A locking member 70 is slidable upon the cover 62, the locking member 70 including an annular region 72 arranged to be received within the recess of the cover 62. The annular region 72 is of diameter smaller than the diameter of the recess of the cover 62, the outer peripheral surface of the annular region 72 being provided with a plurality of gear teeth 74. The annular region 72 is provided with fewer gear teeth 74 than the recess of the cover 62. The locking member 70 further comprises a plate 76 integral with the annular region 72, the plate 76 including a cut-out 78.

The member 58 includes an integral upwardly extending bush 80 which extends through the aperture 66 of the cover 62 and extends through the aperture of the annular region 72 of the locking member 70. The portion of the bush 80 which extends within the aperture of the annular region 72 and upon which the region 72 is journalled for rotation, is eccentric to the remainder of the bush 80. As shown in FIG. 4, this results in the axis of the region 72 being parallel to, but spaced from the axis of the aperture 66, whereby a limited number of the teeth 74 mesh with teeth 68 of the cover 62. A drive plate 82 is keyed to the steering shaft 86 and is rigidly secured to the upper end of the bush 80 by means of screws 84 such that rotation of the steering shaft 86 results in rotation of the member 58 with respect to the housing 50. Since the terminals 56a, 56b are engaged with the housing 50 and member 58 respectively, such rotation results in the spiral connector 56 being either wound more tightly or being unwound, in either case the integrity of the electrical connection to the steering wheel mounted air bag being maintained so long as the rotational movement remains within a predetermined range.

Further, as the steering shaft 86 rotates, different ones of the teeth 74 mesh with different ones of the teeth 68 of the cover 62, and due to the difference in number of teeth provided on the cover 62 and locking member 70, relative rotation of the locking member 70 with respect to the cover 62 takes place. The amount of rotation of the locking member 70 is dependent upon the amount of rotation of the steering shaft 86 and upon the difference in the number of teeth 68, 74, the smaller the difference in the number of teeth, the less rotational movement of the locking member 70 takes place. It will be recognised that reduction arrangements other than the harmonic reduction arrangement described above could be used.

The cut-out 78 of the locking member 70 is positioned such that in one position of the member 58 with respect to the housing 50, preferably the mid-point of the permitted range of rotation of the connector 56, the cut-out 78 aligns with the retaining screw 52 permitting access thereto and hence permitting the housing 50 to be removed from the steering column of the vehicle. In other relative positions of the member 58, the locking member 70 is rotated away from this position, the cut-out 78 no longer affording access to the retaining screw 52, and hence removal of the housing 50 from the steering column being prevented.

Once the support structure has been removed from the steering column, any subsequent rotation of the member 58 with respect to the housing 50 will still result in rotational movement of the locking member 70. Such movement obscures access to the retaining screw 52, hence reattaching the assembly to the vehicle is not possible, such replacement requiring the member 58 to be returned to the position in which access to the retaining screw 52 is permitted. It will thus be recognised that during initial fitting and subsequent removal and replacement it can be ensured that the assembly is fitted such that during subsequent use of the vehicle, rotation of the steering shaft 86 will not result in over-tightening or over unwinding, and hence damage, of the connector 56.

The combination of a slip ring arrangement and a "clock-spring" connector in a common housing using common components such as the member 58 may be advantageous in its own right and may find application irrespective of the absence or otherwise of the harmonic gear type or other locking mechanism.

Figure 5:
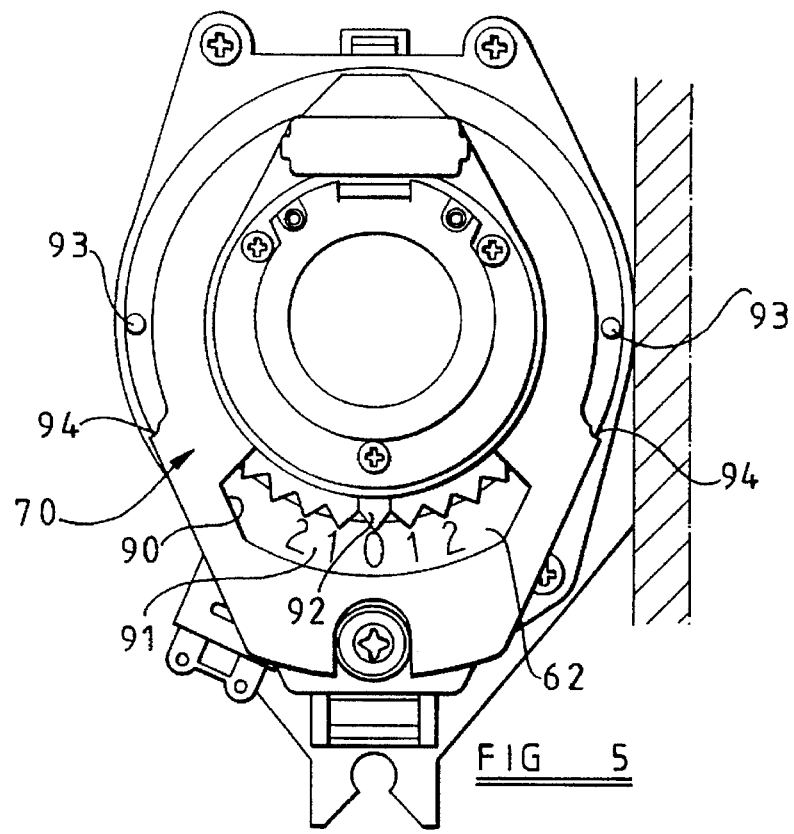
FIG. 5 is a plan view of a modification of the assembly of FIGS. 3 and 4.
Figure 6:
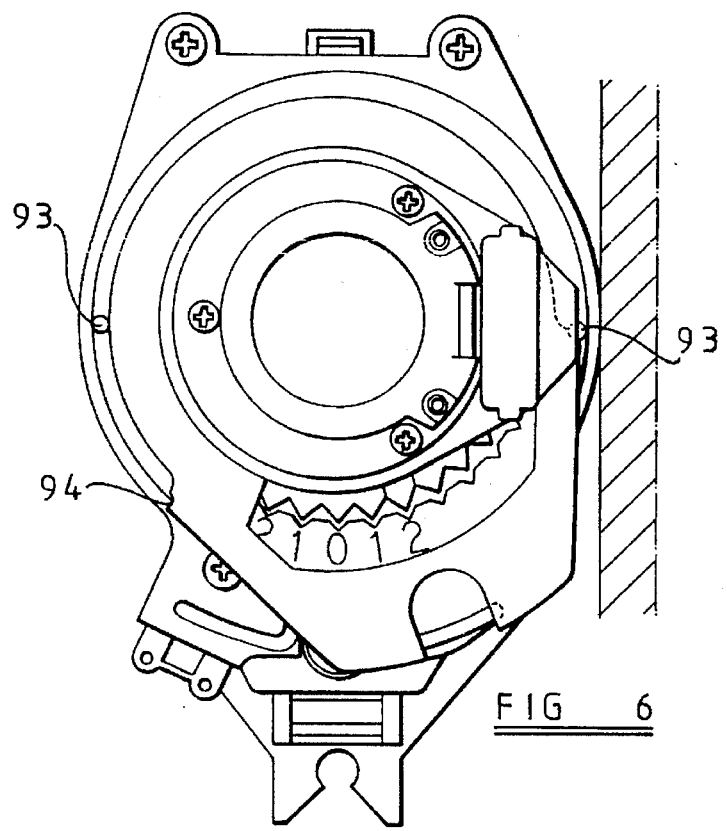
FIG. 6 is a view of the FIG. 5 modification in one of its limit positions.

In the modification illustrated in FIGS. 5 and 6 the locking member 70 is formed with an aperture 90 through which a row 91 of indicia provided on the cover 62 is exposed. The indicia 91 can be printed, engraved, or moulded on the cover 62 and one of the teeth 74 of the plate 70 is painted, or otherwise coloured to define a pointer 92 which, in use, traverses the row of indicia.

The coaction of the pointer 92 with the indicia 91 clearly illustrates the position of the locking member 70 relative to the cover 62 and it can be seen that when the pointer 92 aligns with the centre of the row of indicia the cut-out 78 is centred over the retaining screw 52 to provide access thereto.

FIG. 6 illustrates the locking plate 70 in one of its two opposite limit positions relative to the cover 62. The limit positions are chosen such that travel beyond them will risk the integrity of the connector 56 and it can be seen that the cover 62 is provided with a pair of upstanding, diametrically opposed pins 93 with which shoulders 94 on the locking member 70 abut in the limit positions respectively. The pins 93 and/or the shoulders 94 are arranged to be frangible such that when the assembly is removed from the steering column environment of the vehicle and the member 58 is rotated by hand then the pins 93 and shoulders 94 provide stops resisting further rotation. However, should the assembly be incorrectly installed in relation to the steering column then the frangibility of the pins and/or shoulders is such that the greatly enhanced mechanical advantage which the driver has when rotating the member 58 by means of the steering wheel and steering column of the vehicle, will readily shear either the pin or the abutting shoulder so that steering of the vehicle beyond the limit position of the connector arrangement is not impeded.

FIGS. 7 and 8 are not intended to be drawings of complete, working embodiments, and are provided simply to show variations in the manner in which the harmonic gear reduction mechanism can be incorporated. In FIG. 7 the base of the recess 53 of the housing 50 is formed with the gear teeth 68 and the gear teeth 74 are formed on a locking ring 95 which seats beneath a stationary divider plate 96 forming a stationary member of the "clock-spring" connector 56. The ring 95 is shown as having an indicator pointer 97 upstanding therefrom which cooperates with the housing 50 and it is to be understood that the pointer 97 can be adapted to cooperate with a locking screw in the manner illustrated in FIGS. 3 to 6 or to provide a physical latching resisting removal of the housing 50 from the steering column assembly unless the connector 56 is in its mid position, for example of the type illustrated in FIGS. 1 and 2.

FIG. 8 shows a construction much more similar to FIG. 3, but again using a locking ring 95 having a pointer 97. As described with reference to FIG. 7 the pointer can be replaced by an arrangement for obscuring a locking screw as in FIG. 3, or by means for physically locking the construction to the steering column assembly until the connector 56 is in its central position, for example as shown in FIG. 1.

It will be recognised that other embodiments fall within the scope of the present invention, for example other types of locking arrangement could be used to prevent removal of the support structure from the vehicle, and other types of reduction arrangement could be used to reduce the amount of movement of the locking member with respect to the movement of the steering shaft.

We claim:

1. An electrical connector assembly for making an electrical connection between a component carried by a rotatable steering shaft and a further component carried by a stationary part of a steering column, said assembly comprising a first element to be fixed, in use, and carrying at least one first electrical terminal, a second element rotatable relative to the first element, in use, and carrying at least one second terminal, an elongate flexible conductor electrically connected between the at least one first and second terminals and extending around the axis of rotation of the second element relative to the first element, and a locking assembly including a locking member movable in response to rotation of the second element to and from a datum position relative to the first element such that when the second element is in its datum position, the locking assembly permits removal or replacement of the connector assembly relative to a support structure, the locking assembly preventing such removal or replacement when the second element does not occupy the datum position.

2. A connector assembly as claimed in claim 1, wherein the locking member is movable in response to movement of the second element between a first position in which the locking member does not obscure access to a retainer when the second element is in the datum position, and a second position in which access to the retainer is obscured when the second element does not occupy the datum position.

3. A connector assembly as claimed in claim 1, wherein the locking member is movable between an operative position and an inoperative position in response to movement of the second element to and from the datum position relative to the first element, said locking member in use cooperating with abutment means fixed in relation to the support structure such that when said second element is in said datum position said locking member will be in an inoperative position permitting removal or replacement of the connector assembly relative to said support structure, while when said second element does not occupy said datum position said locking member will engage said abutment means to prevent removal or replacement of the connector assembly relative to said support structure.

4. A connector assembly as claimed in claim 3, wherein the locking member comprises a slidable bolt arranged to move in one direction to engage a first abutment on rotation of the second element with respect to the first element away from said datum position in one direction, and to move in the opposite direction to engage a second abutment on rotation away from said datum position in the other direction.

5. A connector assembly as claimed in claim 4, wherein the first and second abutments comprise walls defining recesses into which the ends of the bolt are slidable, in use.

6. A connector assembly as claimed in claim 4, wherein the second member is provided with an upstanding peg arranged to extend through an elongate aperture provided in a flange provided on the bolt whereby angular movement of said second member results in movement of the peg, and hence in sliding movement of the bolt.

7. A connector assembly as claimed in claim 1 further comprising reduction means whereby a relatively large rotational movement of the second element relative to the first element results in a relatively small movement of the locking member.

8. A connector assembly as claimed in claim 7, wherein the reduction means comprises an harmonic gear reduction mechanism comprising a first member having teeth provided on an inner cylindrical surface thereof, a second member of diameter less than the diameter of said inner cylindrical surface, said second member being provided with a different number of teeth to the first member, and an eccentric cam arranged to be rotated with said second element, said cam cooperating with said second member to cause teeth of the second member to mate with teeth of the first member progressively around said second member as the cam rotates.

9. A connector assembly as claimed in claim 1, said datum position of said second element is a central position in its range of rotation relative to said first element.

* * * * *